(12) United States Patent
Kobayashi

(10) Patent No.: US 9,454,006 B2
(45) Date of Patent: Sep. 27, 2016

(54) HEAD MOUNTED DISPLAY AND IMAGE DISPLAY SYSTEM

(71) Applicant: Seiko Epson Corporation, Tokyo (JP)

(72) Inventor: Shinichi Kobayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 244 days.

(21) Appl. No.: 13/772,552

(22) Filed: Feb. 21, 2013

(65) Prior Publication Data

US 2013/0222215 A1 Aug. 29, 2013

(30) Foreign Application Priority Data

Feb. 28, 2012 (JP) ................................ 2012-041615

(51) Int. Cl.
*G02B 27/01* (2006.01)
*G06F 3/01* (2006.01)

(52) U.S. Cl.
CPC .............. *G02B 27/017* (2013.01); *G06F 3/011* (2013.01); *G02B 2027/014* (2013.01); *G02B 2027/0138* (2013.01); *G02B 2027/0187* (2013.01)

(58) Field of Classification Search
CPC ..... G06F 3/011; G06F 3/012; G02B 27/017; G02B 2027/017; A63F 13/20
USPC .......................................................... 345/8
See application file for complete search history.

(56) References Cited

U.S. PATENT DOCUMENTS

| 5,841,409 | A | 11/1998 | Ishibashi et al. |
| 6,972,734 | B1 * | 12/2005 | Ohshima et al. ................ 345/8 |
| 8,660,303 | B2 * | 2/2014 | Izadi et al. .................... 382/103 |
| 9,110,502 | B2 * | 8/2015 | Fink ........................ G06F 3/012 |
| 2006/0223635 | A1 * | 10/2006 | Rosenberg ..................... 463/37 |
| 2006/0284792 | A1 * | 12/2006 | Foxlin ............................. 345/8 |
| 2012/0086631 | A1 * | 4/2012 | Osman et al. ................ 345/156 |
| 2012/0293548 | A1 * | 11/2012 | Perez .................... G06T 19/006 345/633 |
| 2013/0093788 | A1 * | 4/2013 | Liu .......................... G06F 3/011 345/633 |
| 2014/0063055 | A1 * | 3/2014 | Osterhout et al. ............ 345/633 |

FOREIGN PATENT DOCUMENTS

| JP | 8-339042 A | 12/1996 |
| JP | 2000-338858 A | 12/2000 |
| JP | 2006-285809 A | 10/2006 |
| JP | 2009-135668 A | 6/2009 |

\* cited by examiner

*Primary Examiner* — Amr Awad
*Assistant Examiner* — Stephen Bray
(74) *Attorney, Agent, or Firm* — ALG Intellectual Property, LLC

(57) ABSTRACT

A head mounted display includes an external world information acquisition unit that acquires external world information, a visual effect unit that generates an effect image for visual effect in response to the acquired external world information, and an image display unit that superimposes and displays an outside view on the generated effect image.

15 Claims, 11 Drawing Sheets

| | POSE | EFFECT IMAGE | EFFECT SOUND | PRESSURE PART LEVEL | VIBRATION MOTOR LEVEL |
|---|---|---|---|---|---|
| E01 | XX PUNCH | IMAGE 1 | EFFECT SOUND 1 | 3 | 4 |
| E02 | YY PUNCH | IMAGE 2 | EFFECT SOUND 2 | 5 | 4 |
| E03 | PROTECT | IMAGE 3 | EFFECT SOUND 3 | 0 | 0 |
| E04 | SLASH | IMAGE 4 | EFFECT SOUND 4 | 2 | 3 |
| E05 | RUN AWAY | IMAGE 5 | EFFECT SOUND 5 | 0 | 0 |

HEAD MOUNTED DISPLAY AND IMAGE DISPLAY SYSTEM

BACKGROUND

1. Technical Field

The present invention relates to a head mounted display and an image display system.

2. Related Art

Head mounted displays (HMDs) using a mixed reality (MR) technology of mixing virtual reality and a real world for recognition by a human have been known. The head mounted display superimposes and displays a virtual image of a virtual world drawn by computer graphics on a real image of a real world acquired by an imaging device. For example, Patent Document 1 (JP-A-2006-285609) has disclosed a technology, in a head mounted display, of displaying a synthetic image formed by synthesizing a real image taken by a camera and a virtual image generated based on a viewpoint, a position, and a location of a user of the display. Patent Document 2 (JP-A-8-339042) is another example of related art.

In a head mounted display of related art, by adding a visual effect in response to the viewpoint, the position, and the location of the user to the real image of the real world acquired by the imaging device, an image as if to represent a virtual object existing in the real world may be displayed. However, there has been a request to add virtual effects in response to information of the external world such as people and objects in front of the user.

Note that the request is the common request between non-transmissive head mounted displays and optical transmissive head mounted displays.

SUMMARY

An advantage of some aspects of the invention is to provide a head mounted display that can add a virtual effect in response to external world information.

The invention can be implemented as the following forms or application examples.

Application Example 1

This application example is directed to a head mounted display including an external world information acquisition unit that acquires external world information, a visual effect unit that generates an effect image for visual effect in response to the acquired external world information, and an image display unit that superimposes and displays an outside view on the generated effect image.

According to the configuration, the visual effect unit generates the effect image for visual effect in response to the external world information acquired by the external world information acquisition unit, and the image display unit superimposes and displays the outside view on the generated effect image. As a result, the head mounted display that can add the visual effect in response to the external information to the outside view may be provided.

Application Example 2

This application example is directed to the head mounted display according to the application example 1, which further includes an analysis unit that analyzes the acquired external world information to estimate an action of an actor in the external world, wherein the visual effect unit generates an effect image in response to the estimated action.

According to the configuration, the visual effect unit generates the effect image in response to the action of the actor in the external world estimated by the analysis of the external world information, and thus, the head mounted display that can add the visual effect in response to the action of the actor in the external world may be provided.

Application Example 3

This application example is directed to the head mounted display according to the application example 2, which further includes a touch sensation stimulation unit that is provided in the image display unit and applies a stimulus to a user of the head mounted display through touch sensation, and a touch effect unit that activates the touch sensation stimulation unit in response to the estimated action.

According to the configuration, the touch effect unit activates the touch sensation stimulation unit for applying the stimulus to the user of the head mounted display through touch sensation in response to the action of the actor in the external world estimated by the analysis of the external world information, and thus, the head mounted display that can add the touch effect in response to the action of the actor in the external world may be provided.

Application Example 4

This application example is directed to the head mounted display according to the application example 2 or 3, which further includes a detection unit that detects information on a motion of the user of the head mounted display, wherein the visual effect unit generates the effect image further in response to the information on the motion of the user of the head mounted display detected by the detection unit in addition to the estimated action.

According to the configuration, the visual effect unit generates the effect image further in consideration of the detected information on the motion of the user of the head mounted display in addition to the action of the actor in the external world estimated by the analysis of the external world information.

Application Example 5

This application example is directed to the head mounted display according to any one of the application examples 2 to 4, wherein the external world information acquisition unit includes an imaging device, and the external world information is an image taken by the imaging device.

According to the configuration, in the processing in the head mounted display, the image taken by the imaging device may be used as the external world information.

Application Example 6

This application example is directed to the head mounted display according to any one of the application examples 2 to 4, wherein the external world information is information on the motion of the actor in the external world received from an external device.

According to the configuration, in the processing in the head mounted display, the information on the motion of the actor in the external world received from the external device may be used as the external world information.

Application Example 7

This application example is directed to the head mounted display according to the application example 6, wherein the information on the motion of the actor in the external world includes at least one of acceleration information, angular velocity information, and a heart rate of the actor in the external world.

According to the configuration, in the processing in the head mounted display, at least one of the acceleration information, the angular velocity information, and the heart rate of the actor in the external world may be used as the external world information.

Application Example 8

This application example is directed to the head mounted display according to any one of the application examples 4 to 7, wherein the detection unit includes at least one of a head acceleration information detection part provided in the image display unit for detecting acceleration information of a head of the user of the head mounted display, a head angular velocity information detection part provided in the image display unit for detecting angular velocity information of the head of the user of the head mounted display, and a heart rate meter provided in the image display unit for measuring a heart rate of the user of the head mounted display.

According to the configuration, in the processing in the head mounted display, at least one of the acceleration information of the head of the user of the head mounted display, the angular velocity information of the head of the user of the head mounted display, and the heart rate of the user of the head mounted display may be used as the information on the motion of the user of the head mounted display.

Application Example 9

This application example is directed to an image display system including a plurality of the head mounted displays according to any one of the application examples 6 to 8, wherein the external world information acquisition unit of one of the head mounted displays transmits information on the motion of the user of the head mounted display detected by the detection unit of itself to the other head mounted display that operates as the external device, and acquires the information on the motions of the users of the head mounted displays detected in the respective head mounted displays as the external world information from the other head mounted display.

According to the configuration, one of the head mounted display transmits the information on the motion of the user of the head mounted display detected in itself to the other head mounted display that operates as the external device, acquires the information on the motions of the users of the head mounted displays detected in the respective head mounted displays as the external world information from the other head mounted display, and then, performs the processing according to the application examples. As a result, in the respective head mounted displays forming the image display system, visual effects in response to the acquired external world information may be respectively added.

Application Example 10

This application example is directed to an image display system including a plurality of the head mounted displays according to any one of the application examples 6 to 8, and a server as the external device, wherein the external world information acquisition unit of one of the head mounted displays transmits information on the motion of the user of the head mounted display detected by the detection unit of itself to the server, and acquires the information transmitted by the other head mounted display as the information on the motions of the users of the head mounted displays detected in the respective head mounted displays as the external world information from the server.

According to the configuration, one of the head mounted displays transmits the information on the motion of the user of the head mounted display detected in itself to the server, acquires the information transmitted by the other head mounted display as the information on the motions of the users of the head mounted displays detected in the respective head mounted displays as the external world information from the server, and then, performs the processing according to the application examples. As a result, in the respective head mounted displays forming the image display system, visual effects in response to the acquired external world information may be respectively added.

Note that the invention can be realized in various forms, for example, in the forms of a head mounted display and a control method of the head mounted display, an image display system, a computer program for realization of functions of these method, device, or the system, a recording medium in which the computer program is recorded, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Next, embodiments of the invention will be explained in the following order according to examples.

A. First Embodiment

(A-1) Configuration of Head Mounted Display

Figure 1:
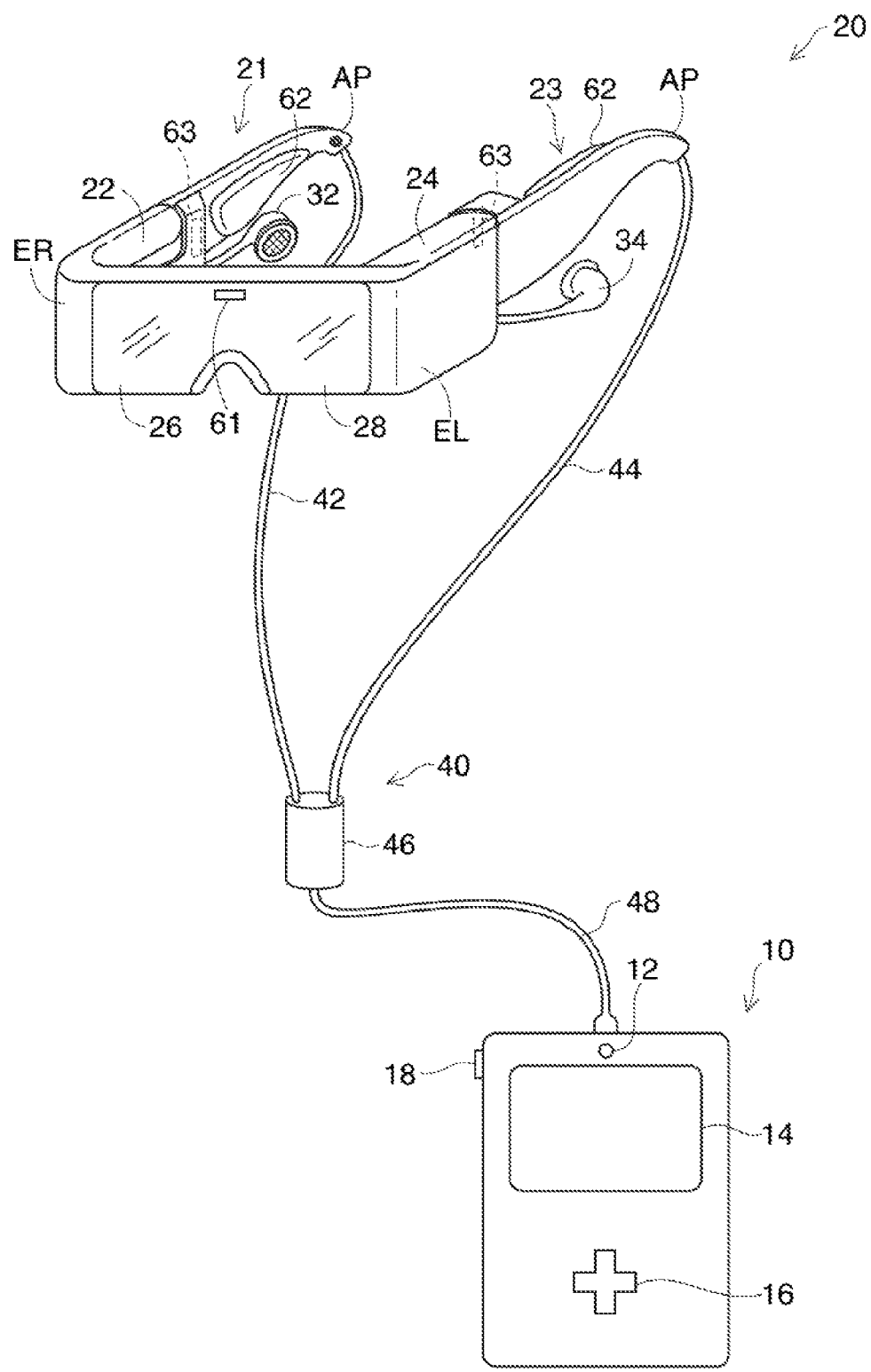
FIG. 1 is an explanatory diagram showing an outer configuration of a head mounted display in one embodiment of the invention.

FIG. 1 is an explanatory diagram showing an outer configuration of a head mounted display in one embodiment of the invention. The head mounted display HM is a head mounted display mounted on a head and also called an HMD. The head mounted display HM of the embodiment is an optical transmissive head mounted display by which a user can visually recognize a virtual image and directly visually recognize an outside view at the same time.

The head mounted display HM includes an image display unit 20 that allows the user to visually recognize a virtual image when the display is mounted on the head of the user, and a control unit (controller) 10 that controls the image display unit 20.

The image display unit 20 is a mounted body mounted on the head of the user and has a spectacle shape in the embodiment. The image display unit 20 has aright holding part 21, a right display drive part 22, a left holding part 23, a left display drive part 24, a right optical image display part 26, a left optical image display part 28, a camera 61, pressure parts 62, and vibration motors 63. The right optical image display part 26 and the left optical image display part 28 are provided in locations in front of the right and left eyes of the user when the user wears the head mounted display HM. One end of the right optical image display part 26 and one end of the left optical image display part 28 are respectively connected in a location corresponding to the glabella of the user when the user wears the head mounted display HM. The right holding part 21 extends from an end ER as the other end of the right optical image display part 26. Similarly, the left holding part 23 extends from an end EL as the other end of the left optical image display part 28.

The right holding part 21 is a member provided to extend from the end ER of the right optical image display part 26 to the location corresponding to the temporal part of the user when the user wears the head mounted display HM nearly orthogonally to the right optical image display part 26. Similarly, the left holding part 23 is a member provided to extend from the end EL of the left optical image display part 28 to the location corresponding to the temporal part of the user when the user wears the head mounted display HM nearly orthogonally to the left optical image display part 28. The right holding part 21 and the left holding part 23 hold the head mounted display HM on the head of the user like temples of spectacles.

The right display drive part 22 is provided inside of the right holding part 21, in other words, at the side opposed to the head of the user when the user wears the head mounted display HM and the side of the end ER of the right optical image display part 26. Further, the left display drive part 24 is provided inside of the left holding part 23 at the side of the end EL of the left optical image display part 28. Note that, as below, the right holding part 21 and the left holding part 23 will be collectively and simply referred to as "holding part", the right display drive part 22 and the left display drive part 24 will be collectively and simply referred to as "display drive part", and the right optical image display part 26 and the left optical image display part 28 will be collectively and simply referred to as "optical image display part".

The display drive part includes an LCD (Liquid Crystal Display), a projection optical system, etc. (not shown). The details will be described later. The optical image display part as an optical member includes a light guide plate and a light adjustment plate (not shown). The light guide plate is formed using a light-transmissive resin material or the like, and outputs image light taken from the display drive part toward the eye of the user. The light adjustment plate is an optical element having a thin plate shape, and provided to cover the front side of the head mounted display HM (the opposite side to the side of the eye of the user). The light adjustment plate may protect the light guide plate and suppress damage on the light guide plate, adhesion of dirt, or the like, and the amount of external light entering the eye of the user may be adjusted and the ease of visual recognition of the virtual image may be adjusted by adjusting the light transmittance of the light adjustment plate. Note that the light adjustment plate can be omitted.

The camera 61 is provided in a location corresponding to the glabella of the user when the user wears the head mounted display HM. The camera 61 takes an outside view in the front direction of the head mounted display HM, in other words, in the opposite direction to the side of the eye of the user, and acquires an outside view image. In the embodiment, the outside view image acquired by the camera 61 corresponds to "external world information". Further, the camera 61 is also referred to as "imaging device". The camera 61 in the embodiment is exemplified as a monocular camera, however, a stereo camera may be employed.

The pressure parts 62 are provided inside of the right holding part 21 and the left holding part 23, in other words, at the sides opposed to the head of the user when the user wears the head mounted display HM in the locations corresponding to the temporal parts of the user when the user wears the head mounted display HM. The pressure parts 62 contain the air in expandable outer members. The pressure parts 62 may increase and decrease their volumes by increasing and decreasing the amounts of internal air. Under the condition that the head mounted display HM is mounted on the head of the user, the pressure parts 62 may apply pressure to the head of the user, in other words, apply stimuli to the user through touch sensation by increasing their volumes. Note that the pressure parts 62 are also referred to as "touch sensation stimulation unit". It is preferable that the outer members of the pressure parts 62 are formed using a material providing a good feeling on the skin such as rubber or polyurethane. Thereby, the wearing comfortability of the head mounted display HM may be improved.

Like the pressure parts 62, the vibration motors 63 are provided inside of the right holding part 21 and the left holding part 23 in the locations corresponding to the temporal parts of the user when the user wears the head mounted display HM. The vibration motors 63 have weights for eccentric rotation provided on shafts of the motors and may generate vibrations at activation. Under the condition that the head mounted display HM is mounted on the head of the user, the vibration motors 63 may apply vibrations to the head of the user, in other words, apply stimuli to the user through touch sensation by activating the motors. Note that the vibration motors 63 are also referred to as "touch sensation stimulation unit".

The image display unit 20 further has a connection unit 40 for connecting the image display unit 20 to the control unit 10. The connection unit 40 includes a main body cord 48 connected to the control unit 10, a right cord 42 and a left cord 44 formed by branching the main body cord 48 into two, and a coupling member 46 provided at the branch point. The right cord 42 is inserted from an end part AP in the extension direction of the right holding part 21 into the casing of the right holding part 21 and connected to the right display drive part 22. Similarly, the left cord 44 is inserted from an end part AP in the extension direction of the left holding part 23 into the casing of the left holding part 23 and connected to the left display drive part 24.

The image display unit 20 and the control unit 10 perform transmission of various signals via the connection unit 40. Connectors (not shown) mating each other are provided respectively at the end opposite to the coupling part 46 in the main body cord 48 and the control unit 10, and the control unit 10 and the image display unit 20 are connected or disconnected by mating or demating of the connector of the main body cord 48 and the connector of the control unit 10. For example, metal cables and optical fibers may be employed for the right cord 42, the left cord 44, and the main body cord 48.

The control unit 10 is a device for controlling the head mounted display HM. The control unit 10 has a lighting part 12, a touch pad 14, a cross key 16, and a power switch 18. The lighting part 12 indicates the operating states of the head mounted display HM (for example, the ON/OFF states of power or the like) by its light emission. As the lighting part 12, for example, an LED (Light Emitting Diode) may be used. The touch pad 14 detects a finger operation of the user on the operation surface of the touch pad 14 and outputs a signal in response to the detected operation. The cross key 16 detects the pressing operation of the key corresponding to the vertical and horizontal directions and outputs a signal in response to the detected operation. The power switch 18 detects the slide operation of the switch to switch power-on and -off states of the head mounted display HM.

Figure 2:
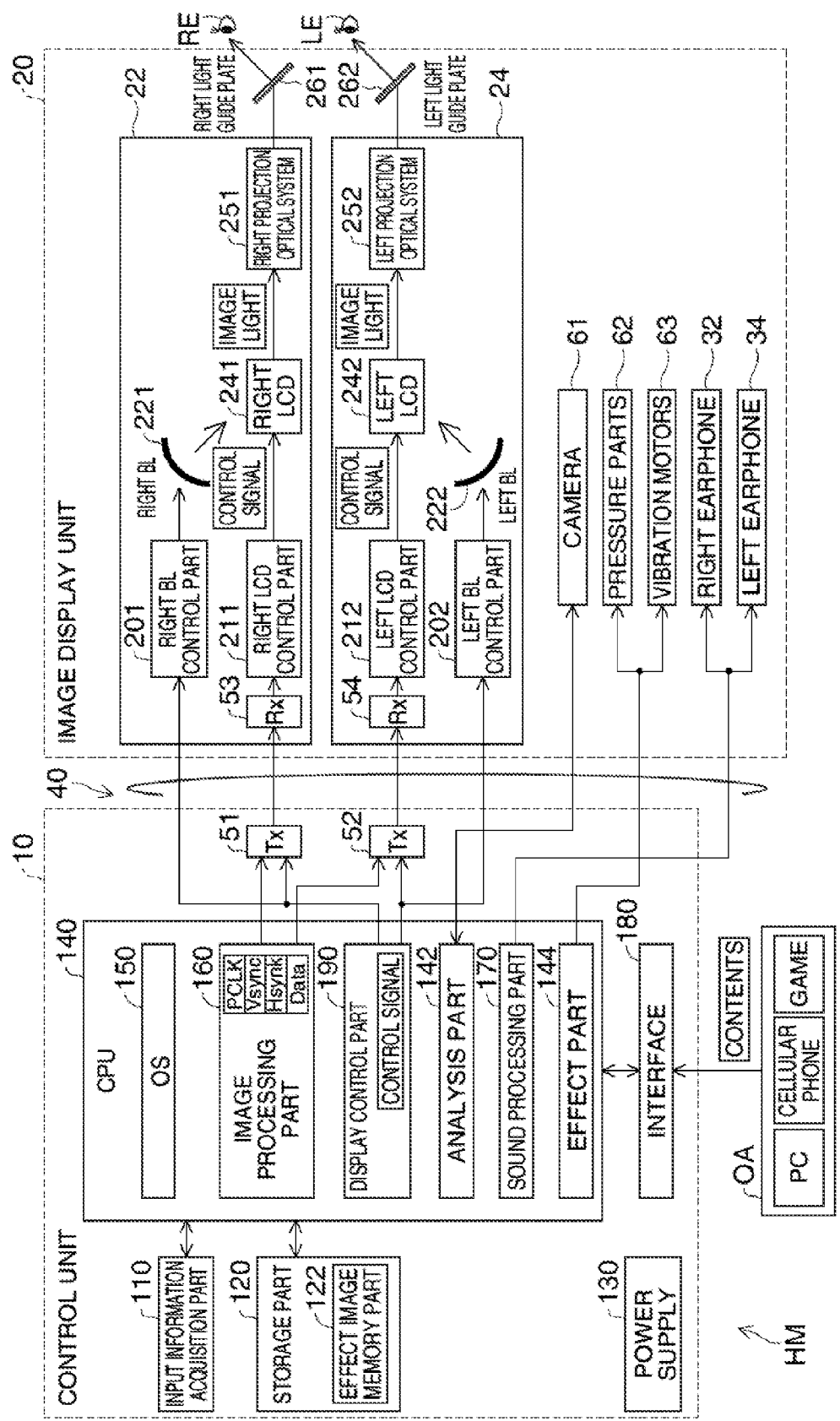
FIG. 2 is a block diagram functionally showing a configuration of the head mounted display.

FIG. 2 is a block diagram functionally showing a configuration of the head mounted display HM. The control unit 10 has an input information acquisition part 110, a storage part 120, a power supply 130, a CPU 140, an interface 180, and transmitter parts (Tx) 51 and 52, and the respective parts are mutually connected via a bus (not shown).

The input information acquisition part 110 has a function of acquiring a signal in response to the operation input by the user such as the operation input for the touch pad 14, the cross key 16, and the power switch 18. The storage part 120 is a storage part including a ROM, a RAM, a DRAM, a hard disc, or the like (not shown). Further, the storage part 120 includes an effect image memory part 122. The details will be described later. The power supply 130 supplies power to the respective units of the head mounted display HM. As the power supply 130, for example, a secondary cell may be used.

The CPU 140 provides a function as an operating system (OS) 150 by executing programs installed in advance. Further, the CPU 140 develops firmware and computer programs stored in the ROM or the hard disc in the RAM and execute them, and thereby, also functions as an analysis part 142, an effect part 144, an image processing part 160, a sound processing part 170, and a display control part 190.

The analysis part 142 and the effect part 144 execute effect processing (the details will be described later) when triggered by an effect processing start request from the OS 150 or an effect processing start request from a specific game application. The analysis part 142 analyzes the external world information acquired by the camera 61 that functions as the external world information acquisition unit. The effect part 144 generates an effect image for visual effect in response to the analysis result.

The image processing part 160 generates a clock signal PCLK, a vertical synchronizing signal VSync, a horizontal synchronizing signal HSync, and image data Data based on effect image data designated in the effect processing to be described later, contents input via the interface 180, etc. and supplies the signals to the image display unit 20 via the connection unit 40.

When the clock signal PCLK, the vertical synchronizing signal VSync, the horizontal synchronizing signal HSync, and the image data Data are supplied based on the designated effect image data, the image processing part 160 acquires display settings (Vsync, Hsync, etc.) predetermined as default values in advance and stored within the storage part 120. The image processing part 160 generates the clock signal PCLK using a PLL (Phase Locked Loop) circuit or the like (not shown) in response to the acquired display settings. Then, the image processing part 160 stores the effect image data Data (RGB data) in the DRAM within the storage part 120.

On the other hand, when the clock signal PCLK, the vertical synchronizing signal VSync, the horizontal synchronizing signal HSync, and the image data Data are supplied based on the contents, first, the image processing part 160 acquires image signals contained in the contents. Generally, the acquired image signals are analog signals including 30 frame images per a second for moving images, for example. The image processing part 160 separates the synchronizing signals of the vertical synchronizing signal VSync, the horizontal synchronizing signal HSync, etc. from the acquired image signals. Further, the image processing part 160 generates the clock signal PCLK using a PLL (Phase Locked Loop) circuit or the like (not shown) in response to the periods of the separated vertical synchronizing signal VSync and the horizontal synchronizing signal HSync. The image processing part 160 converts the analog image signals from which the synchronizing signals have been separated into digital image signals using an A/D converter circuit or the like (not shown). Then, the image processing part 160 stores the converted digital image signals as object image data Data (RGB data) in the DRAM within the storage part 120 with respect to each frame.

Note that, when the effect image data and the contents are provided in digital formats, the clock signal PCLK is output in synchronization with the image signal, and the A/D conversion of the vertical synchronizing signal VSync, the horizontal synchronizing signal HSync, and the analog image signals is unnecessary. Further, as below, the effect image data Data and the object image data Data will be collectively referred to as "image data Data". The image processing part 160 may execute various tone processing such as resolution conversion processing and image correction processing of adjustment of brightness and saturation enlarging, reducing, angle adjustment, etc. and image processing such as keystone correction processing, or the like on the image data Data stored in the storage part 120 according to need.

The image processing part 160 respectively transmits the clock signal PCLK, the vertical synchronizing signal VSync, and the horizontal synchronizing signal HSync generated in the above described manner and the image data Data stored in the DRAM within the storage part 120 via the transmitter parts 51, 52. Note that the image data Data transmitted via the transmitter part 51 is also referred to as "right-eye image data Data1" and the image data Data transmitted via the transmitter part 52 is also referred to as "left-eye image data Data2". The transmitter parts 51, 52 function as transceivers for serial transmission between the control unit 10 and the image display unit 20.

The display control part 190 generates control signals for controlling the right display drive part 22 and the left display drive part 24. Specifically, the display control part 190 individually controls drive ON/OFF of a right LCD 241 by a right LCD control part 211, drive ON/OFF of a right backlight 221 by a right backlight control part 201, drive ON/OFF of a left LCD 242 by a left LCD control part 212, and drive ON/OFF of a left backlight 222 by a left backlight control part 202 using the control signals, and thereby, controls generation and output of the image lights by the respective right display drive part 22 and left display drive part 24. For example, the display control part 190 allows both the right display drive part 22 and the left display drive part 24 to generate image lights, only one of them to generate an image light, or both of them to generate no image light.

The display control part 190 transmits the control signals for the right LCD control part 211 and the left LCD control part 212 via the transmitter parts 51 and 52, respectively. Further, the display control part 190 respectively transmits the control signals for the right backlight control part 201 and the left backlight control part 202.

The sound processing part 170 acquires sound signals contained in the contents, amplifies the acquired sound signals, and supplies the signals to a speaker (not shown) within a right earphone 32 and a speaker (not shown) within a left earphone 34 of the image display unit 20 via the connection unit 40. Note that, for example, when the Dolby (registered trademark) system is employed, processing on the sound signals is performed and different sounds at varied frequencies or the like, for example, are output from the right earphone 32 and the left earphone 34.

The interface 180 is an interface for connection to various external equipment OA as supply sources of contents. As the external equipment OA, for example, there are a personal computer PC, a cellular phone terminal, a game terminal, and the like. As the interface 180, for example, a USB interface, a micro USB interface, an interface for memory card, a wireless LAN interface, a Bluetooth (registered trademark), or the like may be provided.

The image display unit 20 includes the right display drive part 22, the left display drive part 24, a right light guide plate 261 as the right optical image display part 26, a left light guide plate 262 as the left optical image display part 28, the camera 61, the pressure parts 62, the vibration motors 63, the right earphone 32, and the left earphone 34.

The right display drive part 22 includes a receiver part (Rx) 53, the right backlight (BL) control part 201 and the right backlight (BL) 221 that function as a light source, the right LCD control part 211 and the right LCD 241 that function as a display element, and a right projection optical system 251. Note that the right backlight control part 201, the right LCD control part 211, the right backlight 221, and the right LCD 241 are also collectively referred to as "image light generation part".

The receiver part 53 functions as a receiver for serial transmission between the control unit 10 and the image display unit 20. The right backlight control part 201 has a function of driving the right backlight 221 based on the input control signal. The right backlight 221 is a light emitting material such as an LED or electroluminescence (EL), for example. The right LCD control part 211 has a function of driving the right LCD 241 based on the clock signal PCLK, the vertical synchronizing signal VSync, the horizontal synchronizing signal HSync, and the right-eye image data Data1 input via the receiver part 53. The right LCD 241 is a transmissive liquid crystal panel in which plural pixels are arranged in a matrix form.

Figure 3:
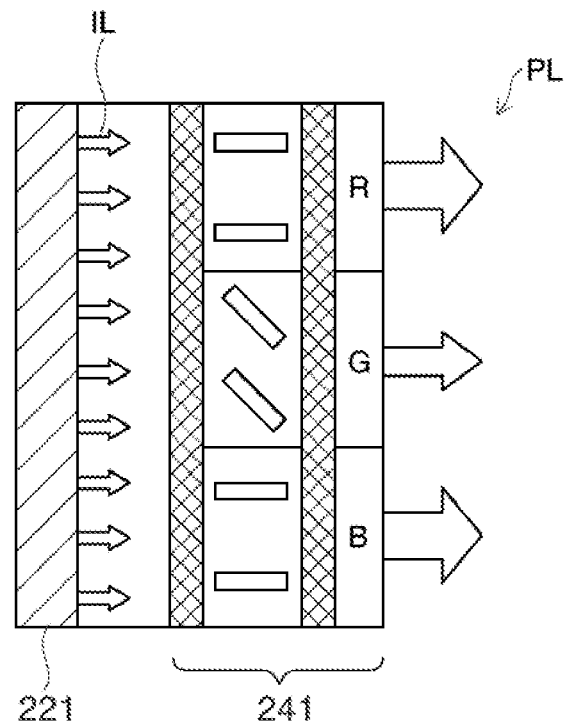
FIG. 3 is an explanatory diagram showing image lights output by an image light generation part.

FIG. 3 is an explanatory diagram showing image lights output by the image light generation part. The right LCD 241 has a function of driving liquid crystal corresponding to the respective pixel locations arranged in the matrix form to change transmittance of the lights transmitted through the right LCD 241, and thereby, modulating illumination lights IL applied from the right backlight 221 into effective image lights PL representing an image. Note that the backlight system is employed in the embodiment as shown in FIG. 3, however, a configuration of outputting image lights using a front light system or a reflection system may be employed.

The right projection optical system 251 in FIG. 2 includes a collimator lens that forms the image lights output from the right LCD 241 into parallel luminous fluxes. The right light guide plate 261 as the right optical image display part 26 guides the image light output from the right projection optical system 251 to the right eye RE of the user while reflecting it along a predetermined optical path. Note that the right projection optical system 251 and the right light guide plate 261 are also collectively referred to as "light guide part".

The left display drive part 24 includes a receiver part (Rx) 54, the left backlight (BL) control part 202 and the left backlight (BL) 222 that function as a light source, the left LCD control part 212 and the left LCD 242 that function as a display element, and a left projection optical system 252. Note that the left backlight control part 202, the left LCD control part 211, the left backlight 222, and the left LCD 242 are also collectively referred to as "image light generation part", and the left projection optical system 252 and the left light guide plate 262 are also collectively referred to as "light guide part". The right display drive part 22 and the left display drive part 24 are paired, and the respective parts of the left display drive part 24 have the same configurations and operations as those of the respective parts to be explained in the right display drive part 22 and their detailed explanation will be omitted.

Figure 4:
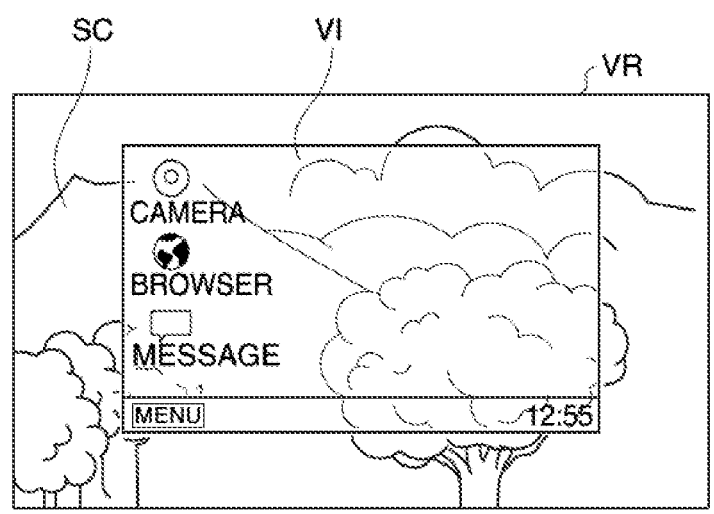
FIG. 4 is an explanatory diagram showing an example of a virtual image recognized by a user.

FIG. 4 is an explanatory diagram showing an example of a virtual image recognized by the user. As described above, the image lights guided to the eyes of the user of the head mounted display HM are imaged on the retinas of the user, and thereby, the user may visually recognize the virtual image. As shown in FIG. 4, the virtual image VI is displayed within a field of view VR of the user of the head mounted display HM. Further, of the field of view VR of the user, with respect to the parts except the part in which the virtual image VI is displayed, the user may see the outside view SC through the right optical image display part 26 and the left optical image display part 28. Note that, in the head mounted display HM of the embodiment, the outside view SC may be seen through on the background of the virtual image VI with respect to the part in which the virtual image VI is displayed of the field of view VR of the user.

(A-2) Configuration of Effect Image Memory Part

Figures 5, 6:
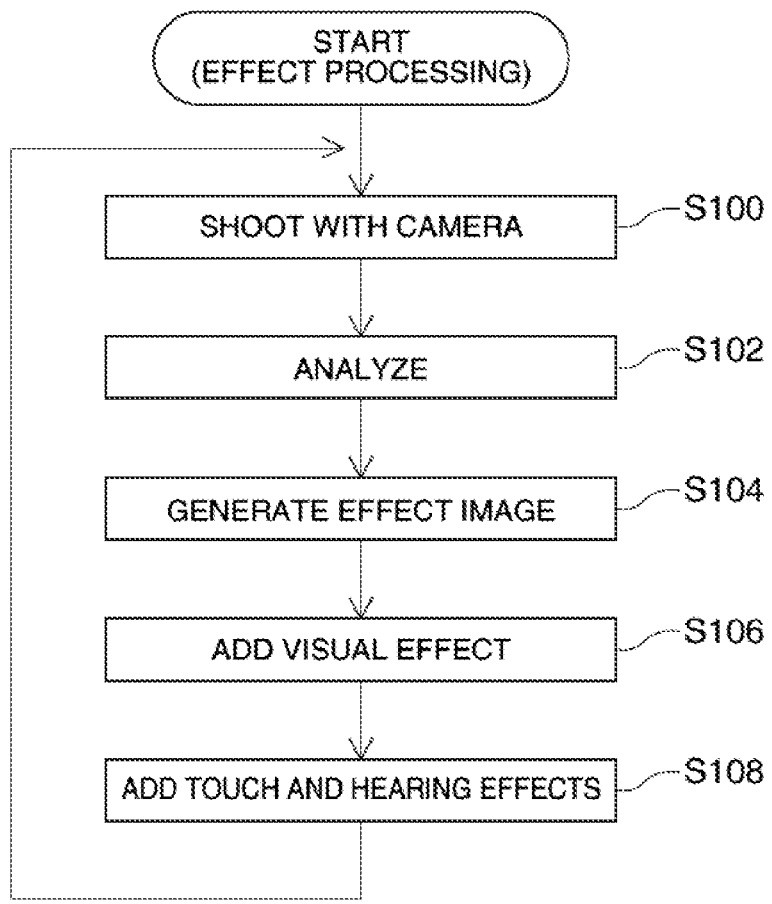
FIG. 5 is an explanatory diagram showing an example of an effect image memory part.
FIG. 6 is a flowchart showing procedures of effect processing.

FIG. 5 is an explanatory diagram showing an example of the effect image memory part 122. The effect image memory part 122 in the embodiment is a table used in effect processing, and used mainly when the effect part 144 generates an effect image according to the external world information.

The effect image memory part 122 includes respective fields of pose, effect image, effect sound, pressure part level, and vibration motor level.

In the pose field, names for identification of "actions of actors in external world" (hereinafter, also referred to as "pose names") are stored in advance. Note that, in the embodiment, "actors in external world" refer to people, animals, robots, etc. that may be actors existing within the range of the line of vision of the user wearing the head mounted display HM, in other words, within the imaging range of the camera 61. As below, for convenience of explanation, the explanation will be made with the actor as a person. "Action" may be translated into "pose", and refers to a position of the entire body of the person or a shape of a part of the body. "Actions (poses)" include a position of a person crouching and girding, a position of a person crossing hands before his or her body, a form of a person with his or her hand (a part of his or her body) like a pistol, etc.

In the effect image field, effect images for effect of the actions associated with the pose names in advance and identified by the pose names are stored. In the effect sound field, effect sounds associated with the pose names in advance are stored. Note that, regarding the effect images and the effect sounds, image data and sound data themselves may be stored or may be stored in forms of file names and file paths of the image data and sound data.

In the pressure part level field, drive levels of the pressure parts 62 associated with the pose names in advance are stored. In the embodiment, the drive levels are classified in six levels of "0" to "5", and "0" indicates a state in which the pressure parts 62 are not driven and "5" indicates a state in which the pressure parts 62 are most strongly driven. In the vibration motor level field, drive levels of the vibration motors 63 associated with the pose names in advance are stored. In the embodiment, the drive levels are classified in six levels of "0" to "5" like those in the pressure part level field.

For example, an example of entry E01 in FIG. 5 shows that, when the pose name is "XX Punch", in the effect processing, "Image 1" is used as the effect image and "Effect Sound 1" is used as the effect sound, and the pressure parts 62 are driven at the drive level "3" and the vibration motors 63 are driven at the drive level "4".

(A-3) Effect Processing

Figure 7A:
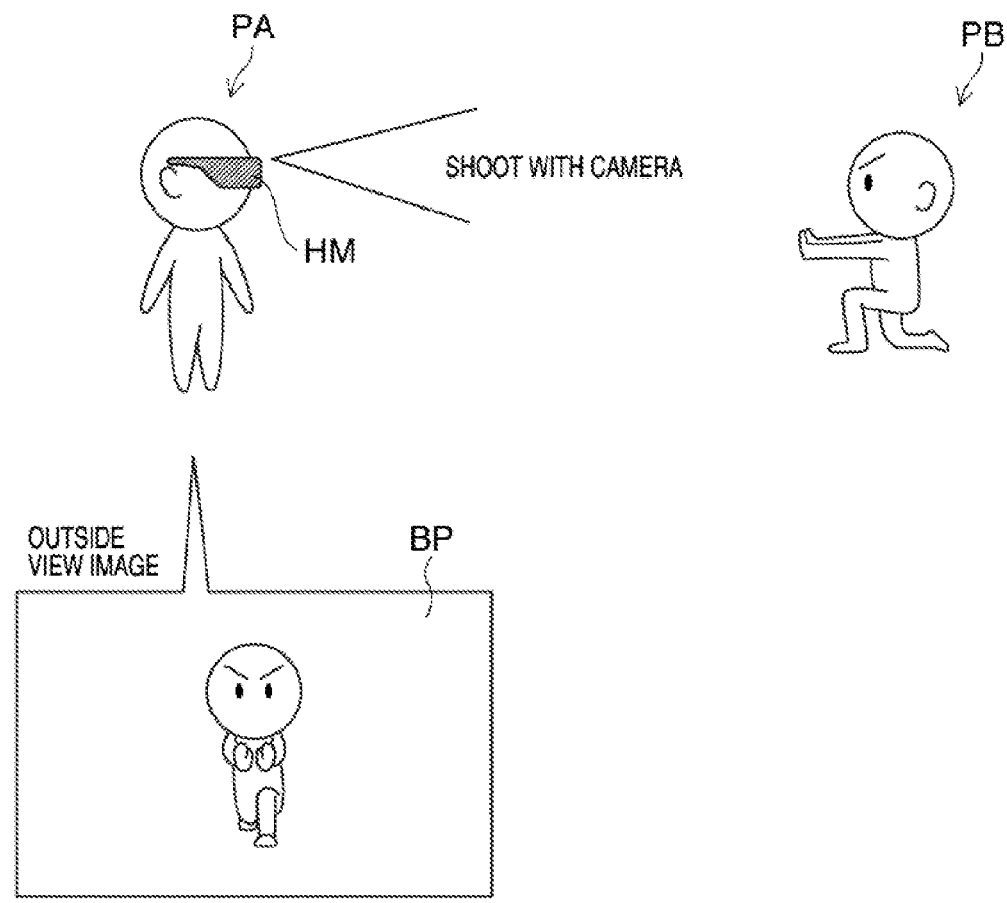
FIGS. 7A and 7B are explanatory diagrams for explanation of the effect processing.

FIG. 6 is a flowchart showing procedures of the effect processing. FIGS. 7A and 7A are explanatory diagrams for explanation of the effect processing. The effect processing is processing executed by the camera 61 as the external world information acquisition part in cooperation with the analysis part 142 and the effect part 144 for acquiring external world information, analyzing the external world information, and adding a visual effect in response to the analysis result. The processing is triggered by an effect processing start request from the OS 150 or an effect processing start request from a specific game application. Note that, when the effect processing is invoked from the specific game application and executed, the effect processing operates as a subroutine of the game application.

First, the camera 61 acquires an outside view image, i.e., external world information by imaging an outside view (step S100). The upper part of FIG. 7A shows a state in which the camera 61 of the head mounted display HM worn by a person PA acquires an outside view image. The lower part of FIG. 7A shows that the outside view image BP acquired by the camera 61 contains a person PB in the external world.

At step S102 in FIG. 6, the analysis part 142 analyzes the outside view image BP received from the camera 61 to estimate "action of actor in external world", and transmits the pose name indicating the estimated action of the person in the external world to the effect part 144 as an analysis result. Specifically, the analysis part 142 estimates the action of the person in the external world using a method of detecting an edge from the outside view image BP by image recognition and checking the feature of the detected edge against a feature file (not shown) stored within the storage part 120 in advance or the like.

The effect part 144 that has received the pose name generates an effect image for visual effect (step S104). Specifically, the effect part 144 searches the effect image memory part 122 with the pose name as a key, and acquires values of the respective fields of the matching entry. Then, when image data itself is stored in the effect image field, the effect image part 144 uses the image data as the effect image without change and, when a file name of the image data is stored in the effect image field, the part acquires and uses the image data identified by the file name as the effect image.

After the generation of the effect image, the effect part 144 adds the visual effect (step S106). Specifically, the effect part 144 transmits the effect image (image data) to the image processing part 160. Note that, at the transmission, the effect part 144 may transmit additional information for displaying the effect image according to the location of the person in the external world to the image processing part 160. For example, the effect part 144 estimates a center point of the person in the external world from the feature of the edge detected from the outside view image BP, calculates an image output location so that the center of the effect image may be located at the center point, and displays the effect image. Further, the frame rate may be changed for the effect image to follow the action of the person. Furthermore, the effect part 144 may transmit the calculated image output location as additional information to the image processing part 160.

Figure 7B:
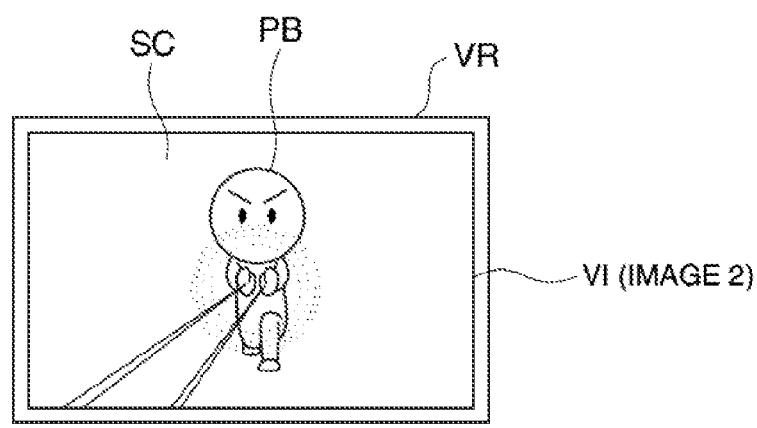

In the image processing part 160 that has received the effect image from the effect part 144, the display processing explained in FIG. 2 is executed. As a result, as shown in FIG. 7B, the effect image (virtual image VI) is displayed in the field of view VR of the user of the head mounted display HM. The head mounted display HM in the embodiment is an optical transmissive head mounted display HM by which the user can visually recognize the virtual image and directly visually recognize the outside view at the same time. Accordingly, the user of the head mounted display HM can visually recognize the person in the external field PB in the outside view SC seen through the right optical image display part 26 and the left optical image display part 28 superposed on the effect image seen as the virtual image VI (Image 2 in the example of the drawing). As a result, the effect part 144 may add a visual effect like "shock wave" for the effect of the estimated action "make attack (XX punch)" of the person PB in the external field as shown in FIG. 7B.

At step S108 in FIG. 6, the effect part 144 adds a touch effect and a hearing effect. Specifically, the effect part 144 activates the pressure parts 62 at the drive level determined in the pressure part level field of the entry searched for at step S104. Similarly, the effect part 144 activates the vibration motors 63 at the drive level determined in the vibration motor level field of the entry searched for at step S104. Further, the effect part 144 generates sound data used as an effect sound from the effect sound field of the entry searched for at step S104, and transmits the generated sound data to the sound processing part 170.

Note that, at step S106 in FIG. 6, the effect part 144 functions as a visual effect unit. Further, at step S108, the effect part 144 functions as a touch effect unit.

As described above, according to the first embodiment, the effect part 144 as the visual effect unit may generate the effect image for visual effect in response to the outside view image (corresponding to the external world information), and the image display unit 20 may display the outside view superimposed on the generated effect image. As a result, the head mounted display HM that can add the visual effect in response to the external world information to the outside view may be provided. Specifically, the effect part 144 generates the effect image for effect of the action in response to the action of the person in the external world (the position of the entire body of the person or the form of a part of the body) estimated by the analysis of the outside view image acquired by the camera 61 as the external world information acquisition unit, and thus, may add the visual effect in response to the action of the person in the external world.

Further, according to the first embodiment, the effect part 144 as the touch effect unit may activate the pressure parts 62 and the vibration motors 63 (corresponding to the touch stimulation unit) that apply stimuli through the touch sensation to the user of the head mounted display HM in response to the action of the person in the external world estimated by the analysis of the external world information, and thus, may add the touch effect in response to the action of the person in the external world. As described above, by adding the touch effect in addition to the visual effect, the head mounted display HM of the embodiment may provide effects with higher realistic sensation to the user.

Note that, if the image processing part 160 performs image correction processing of enlarging, reducing, angle adjustment, etc. on the effect image data Data in response to the distance and the angle from the person in the external world, an effect image matching better with reality may be added.

B. Second Embodiment

In the second embodiment of the invention, a configuration in which a status of a user of a head mounted display HMa is acquired, a visual effect in effect processing is generated in response to the acquired status, and a touch effect and a hearing effect are corrected will be explained. Note that, in the embodiment, "status" refers to information on a motion of the user of the head mounted display HMa, and includes a motion of the head, a motion of the hand, a heart rate, etc. As below, only the parts having different configurations and operations from those of the first embodiment will be explained. Note that, in the drawings, the same component parts as those of the first embodiment have the same signs as those of the first embodiment that has been explained, and their detailed explanation will be omitted.

(B-1) Configuration of Head Mounted Display

Figure 8:
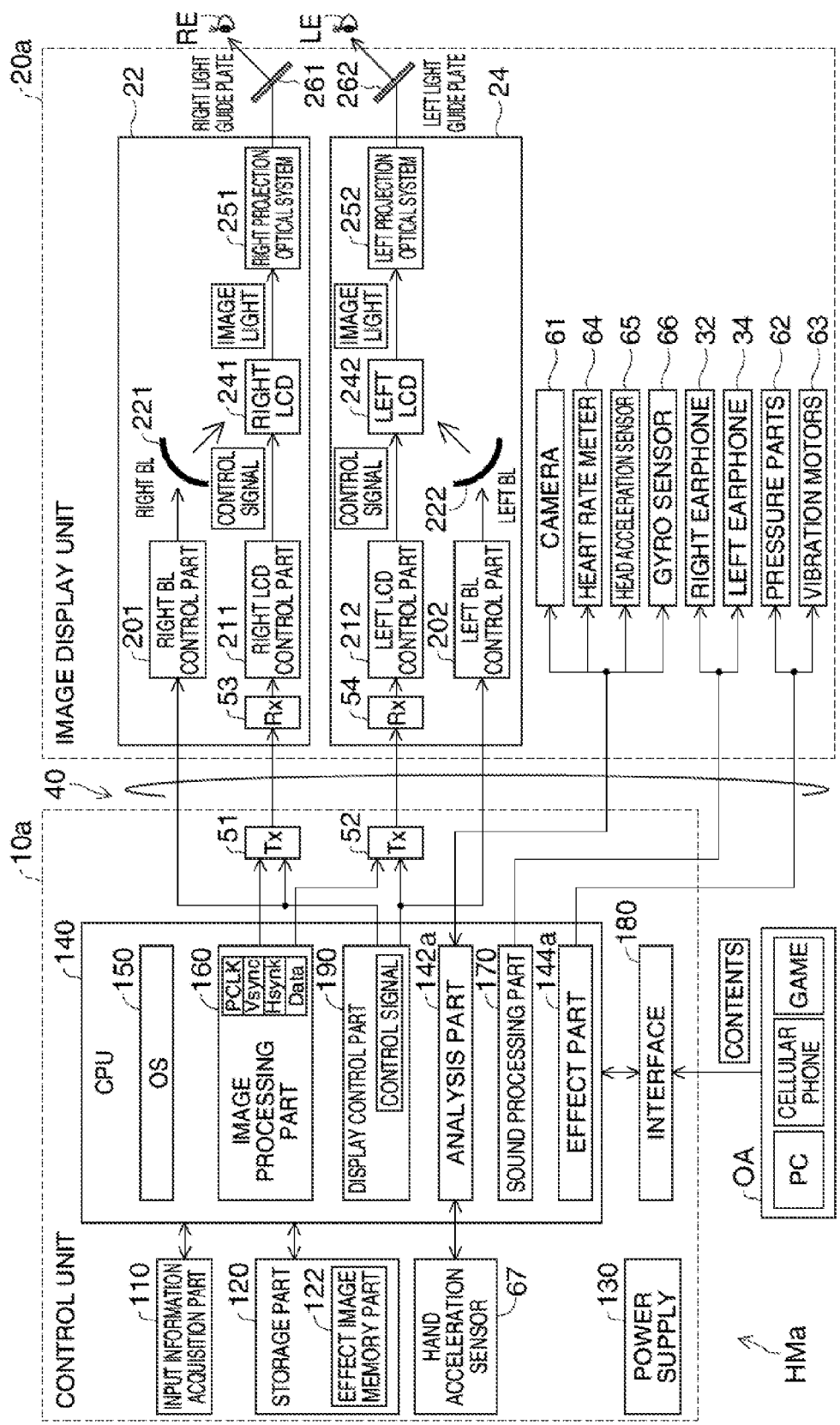
FIG. 8 is a block diagram functionally showing a configuration of a head mounted display in the second embodiment.

FIG. 8 is a block diagram functionally showing the configuration of the head mounted display HMa in the second embodiment. The difference from the first embodiment shown in FIG. 2 is that a control unit 10a and an image display unit 20a are provided in place of the control unit 10 and the image display unit 20, respectively.

The control unit 10a includes an analysis part 142a and an effect part 144a in place of the analysis part 142 and the effect part 144 of the first embodiment, respectively, and further includes a hand acceleration sensor 67. The analysis part 142a and the effect part 144a execute different effect processing from that in the first embodiment. The details will be described later. The hand acceleration sensor 67 is provided within a casing of the control unit 10a. The hand acceleration sensor 67 is a sensor that measures the acceleration of the control unit 10a and used for detection of the motion of the hand of the user of the head mounted display HMa. Note that the hand acceleration sensor 67 is also referred to as "hand acceleration information detection part".

The image display unit 20a further includes a heart rate meter 64, a head acceleration sensor 65, and a gyro sensor 66 compared to the image display unit 20 of the first embodiment. The heart rate meter 64 is provided in a location in contact with a skin of the user of the head mounted display HMa on the outer member surface of the pressure part 62 or the like, for example. The heart rate meter 64 measures the bloodstream of the user of the head mounted display HMa with an infrared ray, and thereby, measures the heart rate of the user. The head acceleration sensor 65 is provided within the casing of the image display unit 20a. The head acceleration sensor 65 is a sensor that measures the acceleration of the image display unit 20a and used for detection of the motion of the head of the user of the head mounted display HMa. Note that the head acceleration sensor 65 is also referred to as "head acceleration information detection part". The gyro sensor 66 is provided within the casing of the image display unit 20a. The gyro sensor 66 is a biaxial angular velocity sensor using piezoelectric vibration, and detects angular velocities of two axes (x-axis, y-axis) of the image display unit 20a. The gyro sensor 66 is used for detection of the motion of the head of the user of the head mounted display HMa. Note that the gyro sensor 66 is also referred to as "head angular velocity information detection unit". Further, the heart rate meter 64, the head acceleration sensor 65, and the gyro sensor 66 are also collectively referred to as "detection part" for detection of the information on the motion of the user of the head mounted display HMa.

(B-2) Configuration of Effect Image Memory Part

The configuration of the effect image memory part 122 in the second embodiment is the same as that of the first embodiment shown in FIG. 5.

(B-3) Effect Processing

Figure 9:
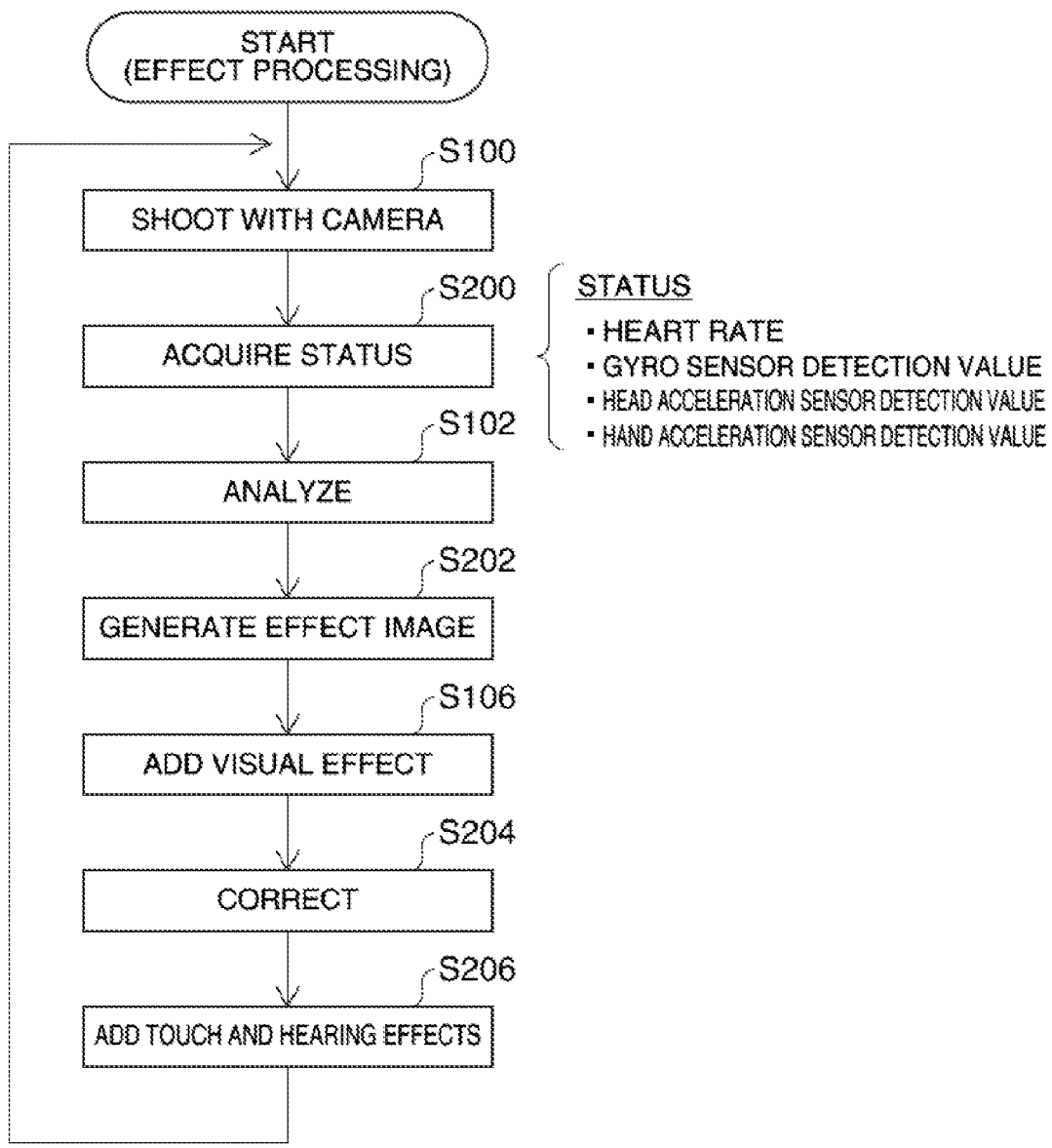
FIG. 9 is a flowchart showing procedures of effect processing in the second embodiment.

FIG. 9 is a flowchart showing procedures of effect processing in the second embodiment. The only difference from the first embodiment shown in FIG. 6 is that step S200 is provided after step S100, step S202 is provided in place of step S104, and steps S204 and S206 are provided in place of step S108.

At step S200 in FIG. 9, the analysis part 142a acquires a status of the user of the head mounted display HMa. Specifically, the analysis part 142a acquires a measurement value of the heart rate meter 64, a detection value of the head acceleration sensor 65, a detection value of the gyro sensor 66, and a detection value of the hand acceleration sensor 67. The analysis part 142a transmits the acquired various detection values as the status to the effect part 144a. At step S102, the analysis part 142a analyzes an outside view image BP received from the camera 61 to estimate "action of person in external world", and transmits a pose name indicating the estimated action of the person in the external world as an analysis result to the effect part 144*a*. The details are the same as those in the first embodiment.

At step S202, the effect part 144*a* generates an effect image for visual effect using the pose name, the status received from the analysis part 142*a*, i.e., information on the motion of the user of the head mounted display HMa. Specifically, the effect part 144*a* searches the effect image memory part 122 with the pose name as a key, acquires values of the respective fields of the matching entry, and generates the effect image based on the contents of the effect image field. The details are the same as those at step S104 of the first embodiment. Further, the effect part 144*a* calculates an image output location when the effect image is displayed in response to the center point of the person in the external world estimated based on the feature of the edge detected from the outside view image BP and the motion of the head of the user of the head mounted display HMa estimated from the detection value of the head acceleration sensor 65 and the detection value of the gyro sensor 66 contained in the received status. Then, the effect part 144*a* transmits the calculated image output location as additional information of the effect image to the image processing part 160. Further, for example, the effect part 144*a* may transmit a command for adjustment of brightness and saturation of the effect image based on the measurement value of the heart rate meter 64 contained in the received status to the image processing part 160.

In this manner, the effect part 144*a* may add the visual effect in consideration of the status (the motion of the head, the motion of the hand, the heart rate, etc.) of the user of the head mounted display HMa in addition to the action of the person in the external world estimated from the outside view image (corresponding to the external world information) of the camera 61. For example, in the case where the estimated action of the person in the external world is "make attack" action and the status of the user of the head mounted display HMa shows "largely deflect head to left", the effect part 144*a* may add a visual effect such that "avoid shock wave radiated from person in external world" by shifting the effect image in display.

At step S204, the effect part 144*a* corrects the touch effect and the hearing effect. Specifically, the effect part 144*a* corrects the drive level of the pressure parts 62 and the drive level of the vibration motors 63 obtained from the values in the respective fields of the entry acquired at step S202 and the sound data used as an effect sound using the measurement value of the heart rate meter 64, the detection value of the head acceleration sensor 65, the detection value of the gyro sensor 66, and the detection value of the hand acceleration sensor 67. Then, the effect part 144*a* activates the pressure parts 62 and the vibration motors 63 at the corrected drive levels. Further, the effect part 144*a* reproduces the sound data at the corrected volume.

In this manner, the effect part 144*a* may add the touch effect and the hearing effect in consideration of the status (the motion of the head, the motion of the hand, the heart rate, etc.) of the user of the head mounted display HMa. For example, in the case where the status of the user of the head mounted display HMa shows "largely deflect head to left", the heart rate of the user is equal to or less than a predetermined threshold value, or the like, the effect part 144*a* corrects the drive level of the pressure parts 62 and the drive level of the vibration motors 63 to be lower and reduces the volume of the effect sound, and thereby, may add the touch effect and the hearing effect such that "avoid shock wave radiated from person in external world".

As described above, according to the second embodiment, the effect part 144*a* as the visual effect unit may generate the effect image in consideration of the status of the user of the head mounted display HMa detected by the heart rate meter 64, the head acceleration sensor 65, and the gyro sensor 66 as the detection unit, i.e., information on the motion of the user of the head mounted display HMa in addition to the action of the person in the external world estimated by the analysis of the external world information. Further, the effect part 144*a* of the second embodiment may add the touch effect and the hearing effect in consideration of the status of the user of the head mounted display HMa.

C. Third Embodiment

In the third embodiment of the invention, an example of constructing an image display system using a plurality of head mounted displays HMb will be explained. As below, only the parts having different configurations and operations from those of the second embodiment will be explained. Note that, in the drawings, the same component parts as those of the second embodiment have the same signs as those of the second embodiment that has been explained, and their detailed explanation will be omitted. In the embodiment, "external world information" refers to information on a motion of a person in the external world received from an external device. Further, "person in external world" refers to a person existing within a range in which wireless communication can be established with a user wearing the head mounted display HMb.

(C-1) Configurations of Image Display System and Head Mounted Display

Figure 10:
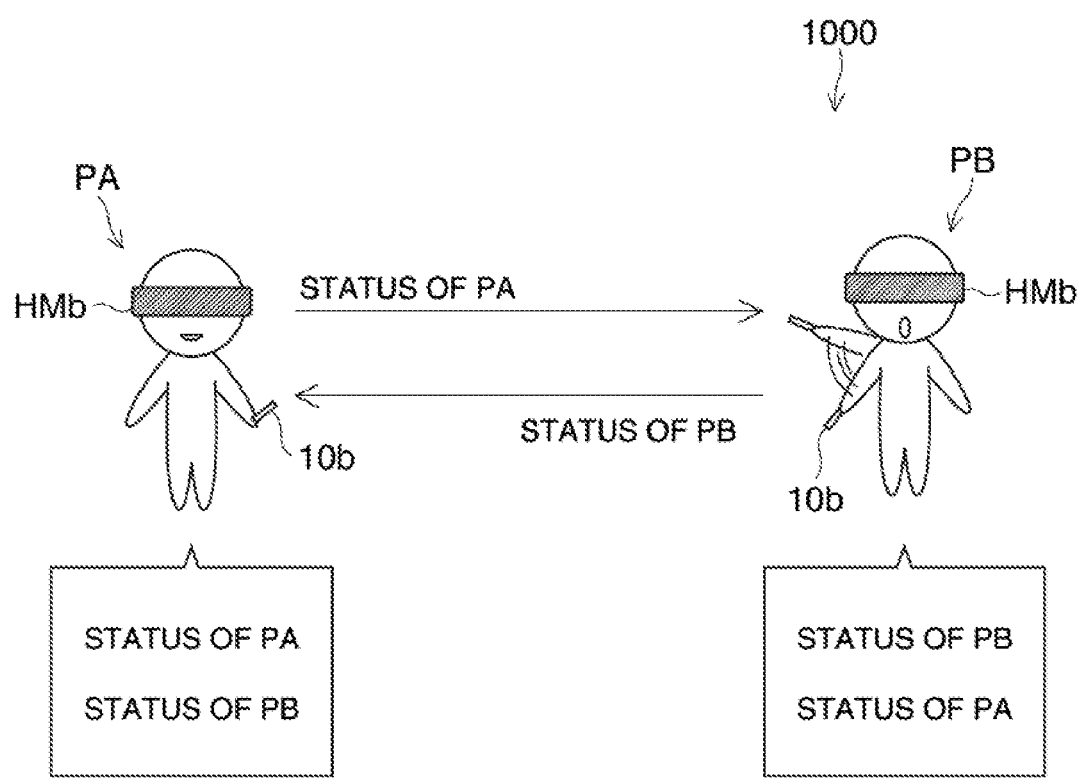
FIG. 10 is an explanatory diagram schematically showing an example of an image display system in the third embodiment.

FIG. 10 is an explanatory diagram schematically showing an example of the image display system 1000 in the third embodiment. The image display system 1000 includes the head mounted displays HMb. In the example of FIG. 10, the head mounted display HMb worn by a person PA and the head mounted display HMb worn by a person PB form one image display system 1000. The head mounted displays HMb belonging to the image display system 1000 transmit statuses measured by themselves as "external world information" between another external device (head mounted displays HMb) and themselves. Note that the two head mounted displays HMb are exemplified in FIG. 10, however, the number of head mounted displays HMb forming the image display system 1000 is not limited.

Figure 11:
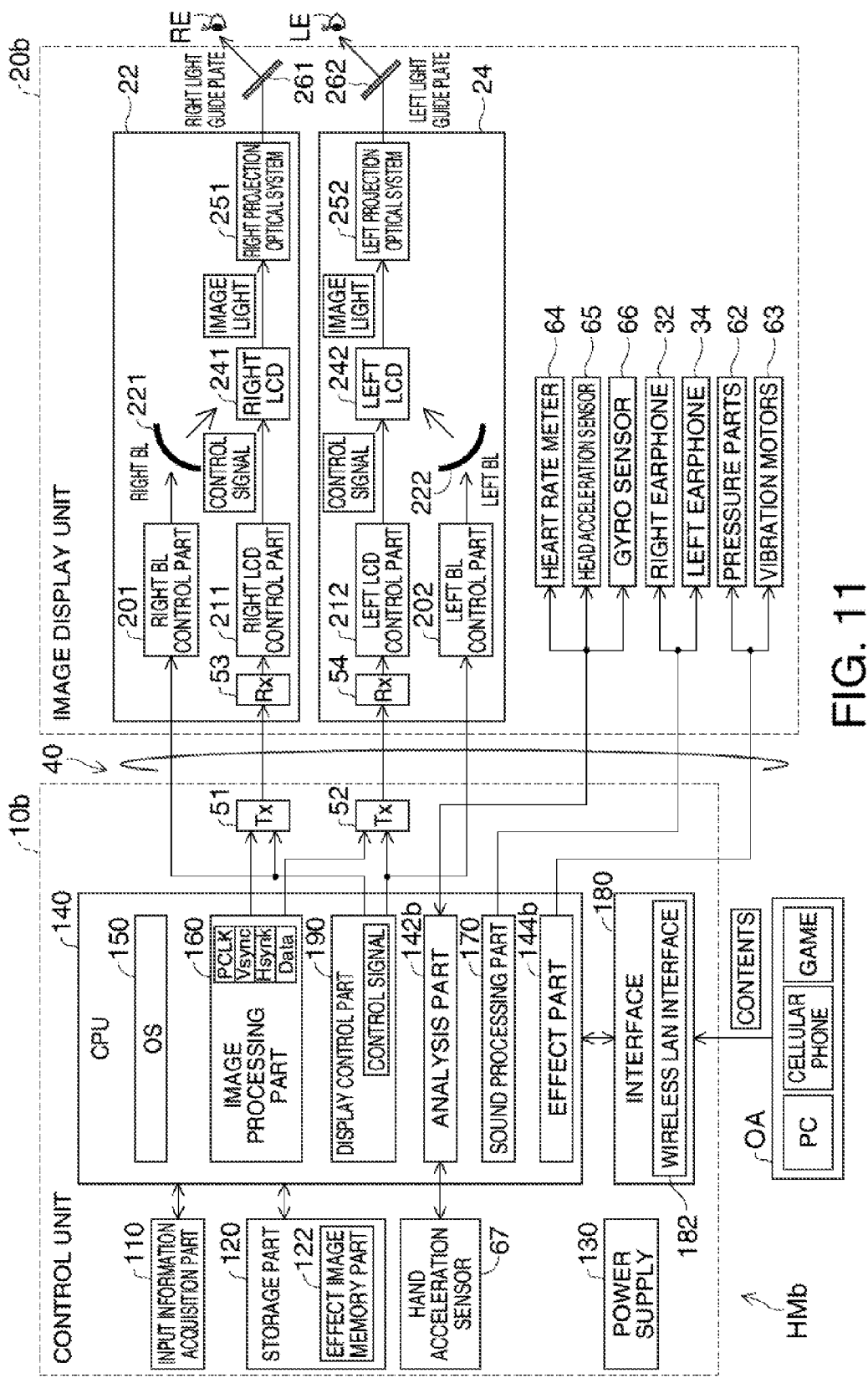
FIG. 11 is a block diagram functionally showing a configuration of a head mounted display in the third embodiment.

FIG. 11 is a block diagram functionally showing a configuration of the head mounted display HMb in the third embodiment. The difference from the second embodiment shown in FIG. 8 is that a control unit 10*b* and an image display unit 20*b* are provided in place of the control unit 10*a* and the image display unit 20*a*, respectively.

The control unit 10*b* includes an analysis part 142*b* and an effect part 144*b* in place of the analysis part 142*a* and the effect part 144*a* of the second embodiment, respectively, and further includes a wireless LAN interface 182 within an interface 180. The analysis part 142*b* and the effect part 144*b* execute different effect processing from that in the second embodiment. The details will be described later. The wireless LAN interface 182 is a control circuit for wireless communication by transmitting and receiving radio waves between the other head mounted display HMb and itself. Note that, in the embodiment, the wireless LAN interface 182 functions as "external world information acquisition unit".

The image display unit 20b is different from the image display unit 20a of the second embodiment in that the camera 61 is not provided.

(C-2) Configuration of Effect Image Memory Part

The configuration of the effect image memory part 122 in the third embodiment is the same as that of the first embodiment shown in FIG. 5.

(C-3) Effect Processing

Figure 12:
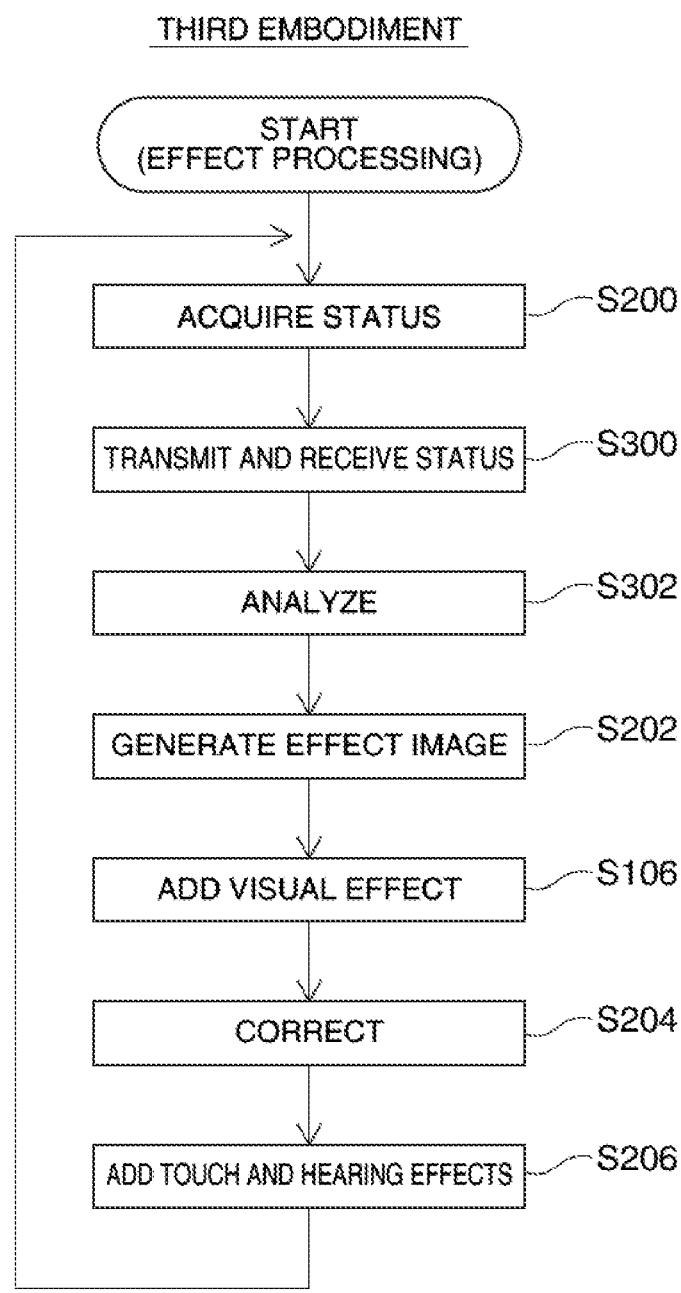
FIG. 12 is a flowchart showing procedures of effect processing in the third embodiment.

FIG. 12 is a flowchart showing procedures of effect processing in the third embodiment. The only difference from the second embodiment shown in FIG. 9 is that step S100 is not provided, step S300 is provided after step S200, step S302 is provided in place of step S102.

At step S200, the analysis part 142b acquires a status of the user of the head mounted display HMb. The details are the same as those in the second embodiment. At step S300, the analysis part 142b transmits and receives the status between the other head mounted display HMb and itself via the wireless LAN interface 182. At step S302, the analysis part 142b analyzes the status of the other head mounted display HMb acquired at step S300 to estimate "action of person in external world" and transmits a pose name indicating the estimated action of the person in the external world as an analysis result to the effect part 144b. Specifically, the analysis part 142b estimates the action of the user of the other head mounted display HMb using the detection value of the head acceleration sensor 65, the detection value of the gyro sensor 66, and the detection value of the hand acceleration sensor 67 contained in the status of the other head mounted display HMb.

At steps S202 and S106, the effect part 144b generates and displays an effect image for visual effect using the pose name and the status of itself received from the analysis part 142b. The details are the same as those in the second embodiment. Further, at steps S204 and S206, the effect part 144b corrects the touch effect and the hearing effect using the status of itself received from the analysis part 142b, activates the pressure parts 62 and the vibration motors 63 at the corrected drive levels, and reproduces the sound data at the corrected volume. The details are the same as those in the second embodiment.

As described above, according to the third embodiment, the analysis part 142b analyzes the status of the other head mounted display HMb acquired by the wireless LAN interface 182 as the external world information acquisition unit, i.e., information on the motion of the person in the external world (corresponding to the external world information), the effect part 144b as the visual effect unit generates the effect image for visual effect in response to the analysis result, and the image display unit 20b displays the outside view superimposed on the generated effect image. As a result, the head mounted display HMb that can add the visual effect in response to the status of the other head mounted display HMb to the outside view may be provided.

Further, according to the third embodiment, one head mounted display HMb transmits the detected status (information on the motion of the user of the head mounted display HMb) to the other head mounted display HMb that operates as an external device, and acquires the statuses detected in the respective head mounted displays HMb as the external world information (information on the motion of the person in the external world) from the other head mounted displays HMb. As a result, in the respective head mounted displays HMb forming the image display system, the effect processing (FIG. 12) may be respectively executed, and the visual effect in response to the acquired external world information may be added.

D. Fourth Embodiment

In the fourth embodiment of the invention, an example of constructing an image display system using a plurality of head mounted displays HMc and a server will be explained. As below, only the parts having different configurations and operations from those of the third embodiment will be explained. Note that, in the drawings, the same component parts as those of the third embodiment have the same signs as those of the third embodiment that has been explained, and their detailed explanation will be omitted.

(D-1) Configurations of Image Display System and Head Mounted Display

Figure 13:
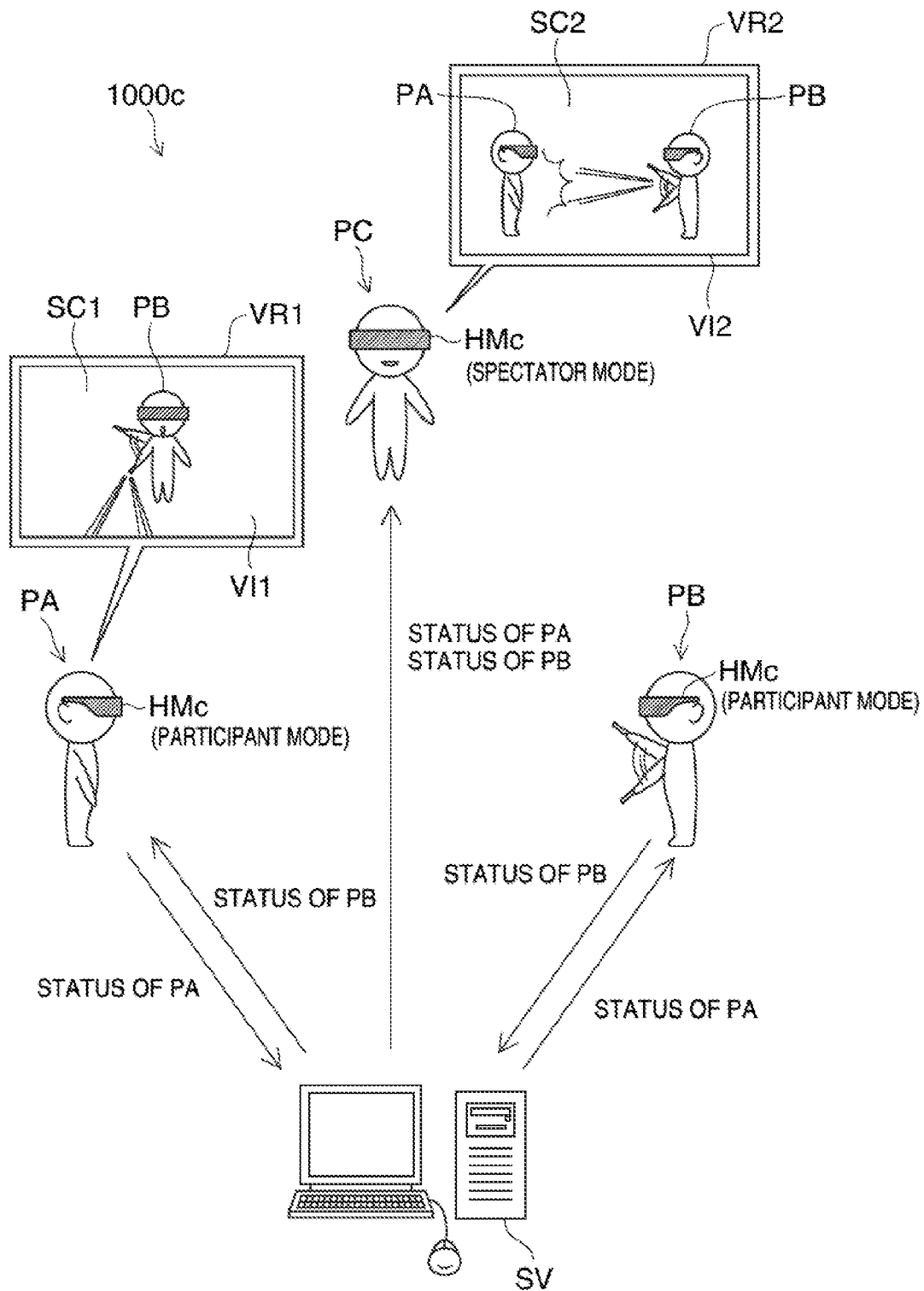
FIG. 13 is an explanatory diagram schematically showing an example of an image display system in the fourth embodiment.

FIG. 13 is an explanatory diagram schematically showing an example of the image display system 1000c in the fourth embodiment. The image display system 1000c includes the head mounted displays HMc and the server SV. In the example of FIG. 13, the head mounted display HMc worn by a person PA and the head mounted display HMc worn by a person PB are in "participant mode", and the head mounted display HMc worn by a person PC is in "spectator mode".

The head mounted display HMc in the participant mode transmits the status measured by itself as "external world information" to the server SV. On the other hand, the head mounted display HMc in the spectator mode does not transmit the status to the server SV. Further, regardless of whether the display is in the participant mode or the spectator mode, the head mounted displays HMc belonging to the image display system 1000c receive the statuses of the other head mounted displays HMc in the participant mode from the server SV. Note that, in FIG. 13, the three head mounted displays HMc and the one server SV are exemplified, however, the numbers of head mounted displays HMc and servers SV forming the image display system 1000 are not limited.

The configuration of the head mounted display HMc in the fourth embodiment is the same as that of the third embodiment shown in FIG. 11.

(D-2) Configuration of Effect Image Memory Part

The configuration of the effect image memory part 122 in the fourth embodiment is the same as that of the first embodiment shown in FIG. 5.

(D-3) Effect Processing

The effect processing in the fourth embodiment is nearly the same as that of the third embodiment shown in FIG. 12. Note that there is a difference that, in the head mounted display HMc in the participant mode, at step S300, the status is transmitted and received between the server SV and itself via the wireless LAN interface 182. As a result, in the head mounted display HMc in the participant mode, the visual effect in response to the status of the other head mounted display HMc in the participant mode received via the server SV is added. For example, in the example of FIG. 13, in a field of view VR1 of the person PA in the participant mode, the person PB in the external world within an outside view SC1 seen through the right and left optical image display parts superimposed on the effect image displayed as a virtual image VI1 can be visually recognized. Note that the same applies to the person PB in the participant mode, and the explanation and illustration will be omitted.

On the other hand, there is another difference that steps S200 and S204 are omitted and the status is received from the server SV via the wireless LAN interface 182 at step S300 from the third embodiment shown in FIG. 12. As a result, in the head mounted display HMc in the spectator mode, the effect image in response to the status of the other head mounted display HMc in the participant mode received via the server SV is added. For example, in the example of FIG. 13, in a field of view VR2 of the person PC in the spectator mode, the persons PA and PB in the external world within an outside view SC2 seen through the right and left optical image display parts superimposed on the effect image displayed as a virtual image VI2 can be visually recognized.

As described above, according to the fourth embodiment, one head mounted display HMc transmits the detected status (information on the motion of the user of the head mounted display HMc) to the server SV, and acquires the statuses detected in the respective head mounted displays HMc as the information transmitted from the server SV to the other head mounted display HMc as the external world information (information on the motions of the persons in the external world). As a result, in the respective head mounted displays HMc forming the image display system, the effect processing (FIG. 12) may be respectively executed, and the visual effect in response to the acquired external world information may be added.

E. Modified Examples

Note that the invention is not limited to the above described examples and embodiments, but can be implemented in various forms without departing from the scope of the invention. For example, the functions realized using software may be realized using hardware. In addition, the following modifications can be made.

E1. Modified Example 1

In the embodiments, the configurations of the head mounted displays have been exemplified. However, the configuration of the head mounted display may be arbitrary determined without departing from the scope of the invention, and, for example, addition, deletion, transformation, etc. of the respective component parts may be performed.

In the embodiments, for convenience of explanation, the control units include the transmitter parts and the image display units include the receiver parts. However, both the transmitter parts and the receiver parts of the embodiments have functions that can perform interactive communication and may function as transceiver parts.

For example, a configuration in which the connection unit is omitted and the control unit can make wireless communication with the image display unit may be employed. Specifically, the control unit further includes a first wireless communication part and the image display unit further includes a second wireless communication part. In this case, the first wireless communication part functions as the transmitter part in the embodiments, and the second wireless communication part functions as the receiver part in the embodiments. Note that power supply to the image display unit in this case may be realized by providing a power supply in the image display unit, connecting the control unit and the image display unit with a cord for power supply, or using contactless power transmission that can supply power without a cord for power supply.

For example, the configurations of the control unit and the image display unit shown in FIG. 1 may be arbitrarily changed. Specifically, for example, the touch pad may be omitted from the control unit and the operation may be performed only using the cross key. Further, another operation interface such as an operation stick may be provided in the control unit. Furthermore, the control unit may have a configuration that can connect to devices such as a keyboard and a mouse for receiving inputs from the keyboard and the mouse. Or, the control unit is provided with a communication part using Wi-Fi (wireless fidelity), Bluetooth, or the like.

For example, the control unit shown in FIG. 1 has been connected to the image display unit via the wired signal transmission path. However, the control unit and the image display unit may be connected by connection via a wireless signal transmission path such as wireless LAN, infrared communication, or Bluetooth.

For example, the head mounted display has been the binocular-type transmissive head mounted display, however, a monocular-type head mounted display may be used. Further, the display may be a non-transmissive head mounted display that blocks an outside view when the user wears the head mounted display. Note that, in the case of the non-transmissive head mounted display, the image processing part may perform display processing using image data of an image formed by superimposing an effect image transmitted from the effect part on an outside view image acquired by the camera. In this manner, the same advantages as those of the embodiments may be obtained in the non-transmissive head mounted display.

For example, the functional parts of the image processing part, the display control part, the analysis part, the effect part, the sound processing part, etc. have been realized by the CPU developing the computer programs stored in the ROMs and hard discs in RAMS and executing them. However, these functional parts may be formed using ASICs (Application Specific Integrated Circuits) designed for realization of the functions.

For example, in the embodiments, the image display unit has been the head mounted display worn like spectacles, however, the image display unit may be a typical planar display device (a liquid crystal display device, a plasma display device, an organic EL display device, or the like). Also, in this case, the connection between the control unit and the image display unit may be connection via a wired signal transmission path or may be connection via a wireless signal transmission path. In this manner, the control unit may be used as a remote of the typical planar display device.

Further, as the image display unit, in place of the image display unit worn like spectacles, for example, an image display unit having another shape such as an image display unit worn like a hat may be employed. Furthermore, an ear-hook type or a head-band type earphone may be employed or the earphone may be omitted.

For example, in the embodiments, the secondary cell has been used as the power supply, however, as the power supply, not limited to the secondary cell, but various batteries may be used. For example, a primary cell, a fuel cell, a solar cell, a thermal cell, or the like may be used.

E2. Modified Example 2

In the embodiments, "external world information" has been explained by taking the specific examples. In the first and second embodiments, "external world information" has referred to the outside view image acquired by the camera and, more specifically, the person contained in the outside view image. In the third and fourth embodiments, "external world information" has referred to the status (information on the motion of the person in the external world) received by the other external device. However, they are just the examples. As "external world information", various information may be employed. For example, as "external world information", environment information outside of the head mounted display (temperature, humidity, constructions such as buildings, trees, etc.) and specific objects (people, animals, foods) may be employed.

For example, the outline of the case of employing environment information (temperature) outside of the head mounted display as "external world information" will be explained. First, a configuration including a temperature sensor in the image display unit is considered. In effect processing, the effect part may generate an effect image in response to the temperature detected by the temperature sensor, and stream BGM in response to the detected temperature. For example, when the temperature is "0° C.", the effect part generates an effect image associated with snow and ice and reproduces BGM giving a cool impression.

For example, the outline of the case of employing environment information (a construction such as a building) outside of the head mounted display as "external world information" will be explained. First, the analysis part receives "effect mode" as an calling argument from the OS or a game application. In effect processing, the effect part may generate an effect image in response to the received effect mode, and stream BGM in response to the effect mode. For example, when "effect mode=end of century", the effect part generates an effect image associated with a ruin with respect to the location of the building detected by image recognition and reproduces BGM giving a decadent impression.

For example, the outline of the case of employing a specific object (food) as "external world information" will be explained. First, in effect processing, the effect part may estimate the kind of food by image recognition, generate an effect image in response to the estimated kind of food, and stream BGM in response to the estimated kind of food. For example, when the food is "fire-pot dish", the effect part generates an effect image showing a hot and streaming state and reproduces BGM associated with a Japanese atmosphere.

E3. Modified Example 3

In the embodiments, the example of the effect image memory part has been shown. However, the effect image memory part in the embodiments is just an example, and various changes can be made.

For example, in addition to the fields exemplified in FIG. 5, the fields respectively defining the effect sound, the drive time of the pressure parts, and the drive time of the vibration motors may be provided.

For example, the effect sound field can be omitted using a moving image file as an effect image, not a still image file. Further, in the configuration without driving the pressure parts and the vibration motors or the configuration of driving them at the uniform levels, the respective fields of the pressure part level and the vibration motor level can be omitted.

E4. Modified Example 4

In the embodiments, the examples of the effect processing have been shown. However, the procedures of the processing shown in FIGS. 6, 9, and 12 are just examples, and various modifications can be made. For example, part of the steps may be omitted or another step may be further added. Or, the sequence of the steps to be executed may be changed.

For example, in the effect processing of the respective embodiments shown in FIGS. 6, 9, and 12, the method of analyzing the external world information (the outdoor view image or status (information on the motion of the person in the external world)) and estimating the action of the person in the external world has been exemplified. However, the estimation method of the action of the person in the external world in the embodiments is just an example, and any method using a known image recognition method or the like may be used.

For example, in the effect processing of the first embodiment shown in FIG. 6, the visual effect is added (step S106), and then, the touch effect and the hearing effect are added (step S108). However, they may be executed at the same time. The same applies to FIGS. 9 and 12.

For example, at step S202 of the effect processing of the second embodiment shown in FIG. 9, the example of the processing by the effect part of generating the effect image using the pose name and the status has been shown. However, the processing in the embodiment is just an example, and may be arbitrarily changed in the range in which the effect part generates the effect image in consideration of the status in addition to the pose name. Specifically, for example, the effect part may generate a new effect image in which two effect images of the effect image generated from the pose name and the effect image generated from the status are superimposed.

For example, in the effect processing of the third embodiment and the fourth embodiment shown in FIG. 12, the configuration using the status (information on the motion of the person in the external world) received from the external device as the external world information, but not using the outside view image obtained by the camera has been explained. However, also, in the effect processing of the third embodiment and the fourth embodiment, like those of the first and second embodiments, the outside view image obtained by the camera may be used. Further, in addition to the status, the outside view image obtained by the camera may be transmitted to and received from the external device.

For example, in the effect processing of the fourth embodiment shown in FIG. 13, the server SV as a device for mediating the status transmission and reception between the respective head mounted displays belonging to the image display system has been explained. However, the server SV may include functional parts that realize the respective functions of the effect image memory part, the analysis part, and the effect part, and issue effect commands to the respective head mounted displays belonging to the image display system. The effect command may contain effect image data and sound data for effect sound, for example. According to the configuration, the respective functions of the effect image memory part, the analysis part, and the effect part may be omitted from the respective head mounted displays, and thereby, the configuration of the head mounted display may be simplified and the manufacturing cost may be reduced.

For example, in the case where the above described effect processing operates as a subroutine of a game application, the analysis part or the effect part may transmit the pose name and the status to the game application. In this manner, technique and damage calculation can be performed using the pose name and the status within the game application.

E5. Modified Example 5

In the embodiments, as the external world information acquisition unit, the camera as the imaging device and the wireless LAN interface have been exemplified. However, they are just examples, and any configuration may be employed as means for acquiring the external world information.

Further, in the embodiments, as the status (information on the motion of the person in the external world) of the other head mounted display, the acceleration information, the angular velocity information, and the heart rate have been acquired via the wireless LAN interface as the external world information acquisition unit. However, they are just examples, and part of them may be omitted and any other information may be employed.

Furthermore, in the embodiments, as the detection unit, the heart rate meter, the head acceleration sensor as the head acceleration information detection part, and the gyro sensor as the head angular velocity information detection part have been exemplified. However, they are just examples, and part of them may be omitted and any other information may be employed.

E6. Modified Example 6

In the embodiments, the image light generation part has been formed using the backlight, the backlight control part, the LCD, and the LCD control part. However, the aspect is just an example. The image light generation part may include a component part for realization of another system with these component parts or in addition to these component parts.

For example, the image light generation part may include an organic EL (Organic Electro-Luminescence) display and an organic EL control part. Further, for example, the invention can be applied to a laser-retina-projection-type head mounted display.

E7. Modified Example 7

Of the component elements in the embodiments and the respective modified examples, the other elements than the configurations described in the independent claim in the appended claims are additional elements and can be omitted.

The entire disclosure of Japanese Patent Application No. 2012-041615, filed Feb. 28, 2012 is expressly incorporated by reference herein.

What is claimed is:

1. A head mounted display comprising:
   an external world information acquisition unit that acquires external world information comprising a pose of an actor in the external world;
   an analysis unit that analyzes the acquired external world information comprising the pose of the actor in the external world to estimate an action of the actor in the external world;
   a detection unit that detects information on a motion of a head of a user of the head mounted display;
   a touch sensation stimulation unit that applies a stimulus to the head of the user of the head mounted display through touch sensation;
   a visual effect unit that generates an effect image for visual effect based on the estimated action of the actor in the external world and the information on the motion of the head of the user of the head mounted display detected by the detection unit;
   a touch effect unit that activates the touch sensation stimulation unit to apply the stimulus to the head of the user of the head mounted display based on the estimated action of the actor in the external world and the information on the motion of the head of the user of the head mounted display detected by the detection unit;
   an image display unit that superimposes and displays the effect image for visual effect generated by the visual effect unit on a view of the external world.

2. The head mounted display according to claim 1, wherein
   the external world information acquisition unit includes an imaging device, and
   the external world information is an image taken by the imaging device.

3. The head mounted display according to claim 1, wherein the external world information comprising the pose of the actor in the external world is information on a motion of the actor in the external world received from an external device.

4. The head mounted display according to claim 3, wherein the information on the motion of the actor in the external world includes at least one of acceleration information, angular velocity information, and a heart rate of the actor in the external world.

5. The head mounted display according to claim 1, wherein the detection unit includes at least one of
   a head acceleration information detection part provided in the image display unit for detecting acceleration information of the head of the user of the head mounted display,
   a head angular velocity information detection part provided in the image display unit for detecting angular velocity information of the head of the user of the head mounted display, and
   a heart rate meter provided in the image display unit for measuring a heart rate of the user of the head mounted display.

6. An image display system comprising a plurality of the head mounted displays according to claim 3, the plurality of the head mounted displays including the head mounted display and another head mounted display that operates as the external device,
   wherein the external world information acquisition unit of the head mounted display
      transmits the information on the motion of the head of the user of the head mounted display detected by the detection unit of the head mounted display to the another head mounted display, and
      acquires, from the another head mounted display, information on motion of a user of the another head mounted display detected by the another head mounted display as the external world information.

7. An image display system comprising a plurality of the head mounted displays according to claim 4, the plurality of the head mounted displays including the head mounted display and another head mounted display that operates as the external device,
   wherein the external world information acquisition unit of the head mounted display
      transmits the information on the motion of the head of the user of the head mounted display detected by the detection unit of the head mounted display to the another head mounted display, and acquires, from the another head mounted display, information on motion of a user of the another head mounted display detected by the another head mounted display as the external world information.

8. An image display system comprising a plurality of the head mounted displays according to claim 5, the plurality of the head mounted displays including the head mounted display and another head mounted display that operates as the external device,
wherein the external world information acquisition unit of the head mounted display
transmits the information on the motion of the head of the user of the head mounted display detected by the detection unit of the head mounted display to the another head mounted display, and
acquires, from the another head mounted display, information on motion of a user of the another head mounted display detected by the another head mounted display as the external world information.

9. An image display system comprising:
a plurality of the head mounted displays according to claim 3, the plurality of the head mounted displays including the head mounted display and another head mounted display that operates as the external device; and
a server as the external device,
wherein the external world information acquisition unit of one of the head mounted displays
transmits the information on the motion of the head of the user of the head mounted display detected by the detection unit of the head mounted display to the server, and
acquires, from the server, information transmitted by the another head mounted display as information on motion of a user of the another head mounted display detected by the head mounted display as the external world information.

10. An image display system comprising:
a plurality of the head mounted displays according to claim 4, the plurality of the head mounted displays including the head mounted display and another head mounted display that operates as the external device; and
a server as the external device,
wherein the external world information acquisition unit of one of the head mounted displays
transmits the information on the motion of the head of the user of the head mounted display detected by the detection unit of the head mounted display to the server, and
acquires, from the server, information transmitted by the another head mounted display as information on motion of a user of the another head mounted display detected by the head mounted display as the external world information.

11. An image display system comprising:
a plurality of the head mounted displays according to claim 5, the plurality of the head mounted displays including the head mounted display and another head mounted display that operates as the external device; and
a server as the external device,
wherein the external world information acquisition unit of one of the head mounted displays
transmits the information on the motion of the head of the user of the head mounted display detected by the detection unit of the head mounted display to the server, and
acquires, from the server, information transmitted by the another head mounted display as information on motion of a user of the another head mounted display detected by the head mounted display as the external world information.

12. The head mounted display according to claim 1, further comprising:
an effect image memory part including effect image data representative of a plurality of predetermined effect images associated with a plurality of actions,
wherein the visual effect unit generates the effect image for visual effect by:
searching the effect memory part to identify, as the effect image for visual effect, a predetermined effect image associated with the estimated action of the actor in the external world, and
calculating an effect image output location based at least in part on the information on the motion of the head of the user of the head mounted display detected by the detection unit, and
wherein the image display unit displays the effect image for visual effect generated by the visual effect unit at the calculated effect image output location.

13. The head mounted display according to claim 12, wherein:
the effect image memory part further includes touch effect data representative of a plurality of predetermined touch sensations associated with the plurality of estimated actions; and
the touch effect unit activates the touch sensation stimulation unit to apply the stimulus to the head of the user of the head mounted display by:
searching the effect image memory part to identify a predetermined touch sensation associated with the estimated action of the actor in the external world,
correcting the identified predetermined touch sensation based on the information on the motion of the head of the user of the head mounted display, and
activating the touch sensation stimulation unit to apply, as the stimulus to the head of the user of the head mounted display, the corrected predetermined touch sensation.

14. The head mounted display according to claim 12, wherein the information on the motion of the head of the user of the head mounted display comprises at least one of acceleration information and angular velocity information of the head of the user of the head mounted display.

15. The head mounted display according to claim 1, further comprising:
one or more speakers; and
a hearing effect unit that causes the one or more speakers to output an effect sound based on the estimated action of the actor in the external world and the information on the motion of the head of the user of the head mounted display detected by the detection unit.

* * * * *